US008710392B2

(12) United States Patent
Mironets et al.

(10) Patent No.: US 8,710,392 B2
(45) Date of Patent: Apr. 29, 2014

(54) ELECTRIC DISCHARGE MACHINING HOLE DRILLING

(75) Inventors: Sergey Mironets, Norfolk, CT (US); James M. Koonankeil, Malborough, CT (US); Edward F. Pietraszkiewicz, Southington, CT (US); Thomas R. Davis, Yalesville, CT (US)

(73) Assignee: United Technologies Corporation, Hartford, CT (US)

( * ) Notice: Subject to any disclaimer, the term of this patent is extended or adjusted under 35 U.S.C. 154(b) by 348 days.

(21) Appl. No.: 13/171,935

(22) Filed: Jun. 29, 2011

(65) Prior Publication Data

US 2013/0001203 A1 Jan. 3, 2013

(51) Int. Cl.
*B23H 1/02* (2006.01)
*B23H 1/10* (2006.01)
*B23H 9/10* (2006.01)
*B23H 9/14* (2006.01)

(52) U.S. Cl.
USPC .................. 219/69.13; 219/69.14; 219/69.17

(58) Field of Classification Search
USPC ............ 219/69.11, 69.14, 69.17, 69.13, 69.2; 204/224 M; 205/641, 642, 645, 665
See application file for complete search history.

(56) References Cited

U.S. PATENT DOCUMENTS

| | | | |
|---|---|---|---|
| 3,851,135 A * | 11/1974 | Moracz et al. | 219/69.17 |
| 3,981,786 A * | 9/1976 | Andrews | 219/69.17 |
| 4,159,407 A | 6/1979 | Wilkinson et al. | |
| 4,335,436 A | 6/1982 | Inoue | |
| 4,484,051 A | 11/1984 | Yamada et al. | |
| 4,495,394 A * | 1/1985 | McGregor et al. | 219/69.13 |
| 4,725,705 A | 2/1988 | Holland-Moritz et al. | |
| 4,760,233 A * | 7/1988 | Obara | 219/69.16 |
| 4,767,903 A * | 8/1988 | Sciaroni | 219/69.17 |
| 5,004,530 A * | 4/1991 | Tanaka | 219/69.14 |
| 5,181,177 A | 1/1993 | Bond et al. | |
| 5,539,648 A * | 7/1996 | Baker | 219/69.17 |
| 5,702,288 A | 12/1997 | Liebke et al. | |
| 6,339,208 B1 | 1/2002 | Rockstroh et al. | |
| 6,388,223 B2 | 5/2002 | Jones et al. | |
| 6,403,910 B1 | 6/2002 | Stang et al. | |
| 6,417,475 B1 | 7/2002 | Duffin | |
| 6,850,874 B1 | 2/2005 | Higuerey et al. | |
| 2003/0168350 A1* | 9/2003 | Velez et al. | 205/640 |

FOREIGN PATENT DOCUMENTS

EP 1832376 A2 9/2007

(Continued)

OTHER PUBLICATIONS

Machine translation of Japan Patent No. 5-285,738, Jul. 2013.*
Z. Yu & K.P. Rajurkar, Study of Dielectric Flow in Micro Hole Drilling by EDM, Society of Manufacturing Engineers, MAMRC Thirty-Three, May 24-27, 2005, New York, New York, TP05PUB139.

(Continued)

*Primary Examiner* — Geoffrey S Evans
(74) *Attorney, Agent, or Firm* — Kinney & Lange, P.A.

(57) ABSTRACT

An apparatus and method for machining apertures into a conductive workpiece is disclosed. The apparatus has a tank capable of holding a dielectric fluid, and a fixture for holding the workpiece in the tank. An electric discharge machine with an electrode, a power supply connected to the electrode that produces machining pulses for electric discharge machining through the workpiece, and a controller for regulating the power supply and electrode position is also part of the apparatus. Finally, the apparatus has a pressure transducer connected to the fixture, and a process controller in communication with the electric discharge machine controller and pressure transducer.

17 Claims, 6 Drawing Sheets

(56) References Cited

FOREIGN PATENT DOCUMENTS

| | | | | |
|---|---|---|---|---|
| GB | 2428608 | A | * | 2/2007 |
| GB | 2428608 | A | | 2/2007 |
| JP | 60-255357 | A | * | 12/1985 |
| JP | 63-185520 | A | * | 8/1988 |
| JP | 05-285738 | A | * | 11/1993 |
| JP | 11-123616 | A | * | 5/1999 |
| WO | WO-2006/133991 | A | * | 12/2006 |

OTHER PUBLICATIONS

John A. Bloom, EDM—Dielectric Selection and Dielectric Filtering, American Socity of Took and Manufacturing Engineers, MR62-587 Technical Paper.

The European Search Report mailed Oct. 2, 2013 for European Application No. 12174236.5.

* cited by examiner

ELECTRIC DISCHARGE MACHINING HOLE DRILLING

BACKGROUND

The present invention relates to apparatuses and methods for performing high-speed electric discharge machining operations. More particularly, the present invention relates to an apparatus and a method for performing an electric discharge machining operation, wherein the apparatus is adaptable determine the hole, or multiple holes, effective area as a function of back pressure gradient and breakthrough for a workpiece.

A gas turbine engine typically includes a core engine having, in serial flow arrangement, a high pressure compressor that compresses airflow entering the engine, a combustor that burns a mixture of fuel and air, and a turbine that includes a plurality of airfoils in both rotating blades and stationary vane assemblies that interact to extract rotational energy from airflow exiting the combustor. The turbine is subjected to high temperature airflow exiting the combustor. Therefore, turbine components are cooled to reduce thermal stresses that may be induced by the high temperature airflow.

The rotating blades and stationary vanes include hollow airfoils that are supplied cooling air through cooling channels that vent through cooling apertures in the airfoil and/or through openings at the top of the airfoil. The airfoils include a cooling cavity bounded by sidewalls that define the cooling cavity. The cooling cavity is partitioned into cooling chambers that define flow paths for directing the cooling air. During airfoil manufacture, the cooling holes in the airfoil are drilled or machined from the outer side of the airfoil to the internal cooling cavity. More specifically, an electric discharge machining process is used to create the cooling apertures into the desired dimensions.

Electric discharge machining (EDM), sometimes referred to as "electro-discharge machining" or "electrode discharge machining", is a known process for drilling deep, small diameter holes in a metal workpiece, such as a turbine blade or vane of a gas turbine engine. EDM operates on the principle that, if a electrically-charged EDM tool (typically, a negatively-charged copper-alloy electrode) is brought within close proximity to a electrically-charged (for example, positively-charge if the electrode is negatively-charged) workpiece which is sometimes submerged in a bath of dielectric fluid (typically, water), an electric potential difference exists between the electrode and the workpiece and a spark discharge will arc the gap therebetween, thereby eroding a small amount of material from the workpiece adjacent the electrode. If the negative charge to the electrode is in the form of a series of pulse charges, the electric potential difference between the electrode and the workpiece is systematically repeated such that spark discharges occur at a rapid rate, and a hole can be "drilled" into the workpiece if the electrode is incrementally advanced into the workpiece as workpiece material is slowly eroded therefrom. The dielectric fluid assists in the formation of the spark discharges, cools the workpiece during repeated spark discharges and carries away material eroded from the workpiece.

The existing EDM drilling process for creating cooling holes has no instant feedback in terms of airflow flowing through the holes being drilled. The current state of the art does not have means to adjust for core and wall thickness variation of castings to control the in-process airflow within a workpiece. The in-process airflow testing is done after the entire drilling operation is complete. As a result, the in-process airflow test results may deviate from the target values. That, in turn, affects the final airflow capability and causes non-conforming hardware and workpieces. In addition, the current manufacturing process lacks a reliable real time method of machining performance and feedback for the detection of hole breakthrough. Current manufacturing processes and machine designs lack the ability to cut off machining to prevent wall strikes on the interior of the workpiece. The lack of control has become an important consideration given the growing complexity of internal core geometry for workpieces. Prior methods developed to address this aspect of the machining process involved the measurement and feedback of the machining head velocity and/or monitoring and feedback of the voltage from the electrode/head. These prior methods are not reliable due to the complexity of airfoil machining and internal cavities that do not always provide clean breakthrough, and therefore signature analysis becomes difficult.

SUMMARY

An apparatus for machining apertures into a conductive workpiece is disclosed. The apparatus has a tank that can hold a dielectric fluid, and a fixture for holding the workpiece in the tank. The apparatus also has electric discharge machine for forming apertures in the workpiece by electric discharge machining. Finally, the apparatus has a pressure transducer for sensing pressure within the workpiece connected to the fixture, and a process controller in communication with an electric discharge machine controller and pressure transducer for controlling operation of the electric discharge machine as a function of the sensed pressure.

In a second embodiment, a method of machining a workpiece utilizing electric discharge machining starts with securing a workpiece to a fixture in a tank. A pressure transducer to sense pressure within the workpiece is connected to the fixture. Material is removed from the workpiece by electric discharge machining to create at least one aperture in the workpiece. The material removal is stopped based upon a signal received from the pressure transducer.

In another embodiment, a method of drilling a plurality of holes in a gas engine turbine component is disclosed. The component is fixtured within a bed of fluid in a tank, and a pressure transducer is connected to the component through the fixture. The electric discharge machine is positioned over the component to machine the plurality of holes simultaneously by utilizing the electric discharge machine containing a plurality of electrodes. Pressure form an interior cavity of the component is sensed with a pressure transducer. A signal from the pressure transducer based on the sensed pressure is provided to stop the machining.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Figure 1:
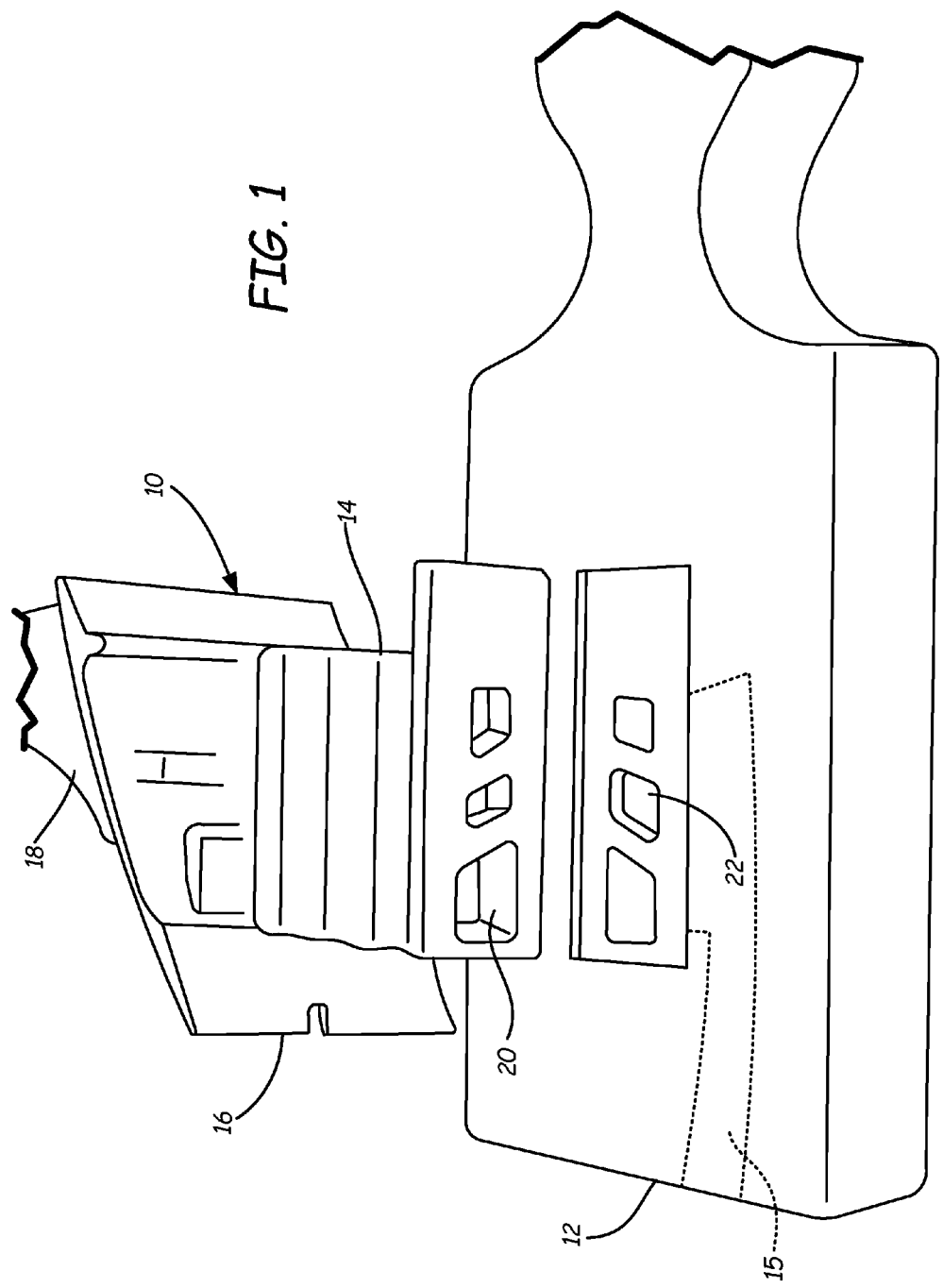
FIG. 1 is a perspective view of a workpiece and a portion of a fixture.

Efforts have been made throughout the drawings to use the same or similar reference numerals for the same or like components.

Figure 2:
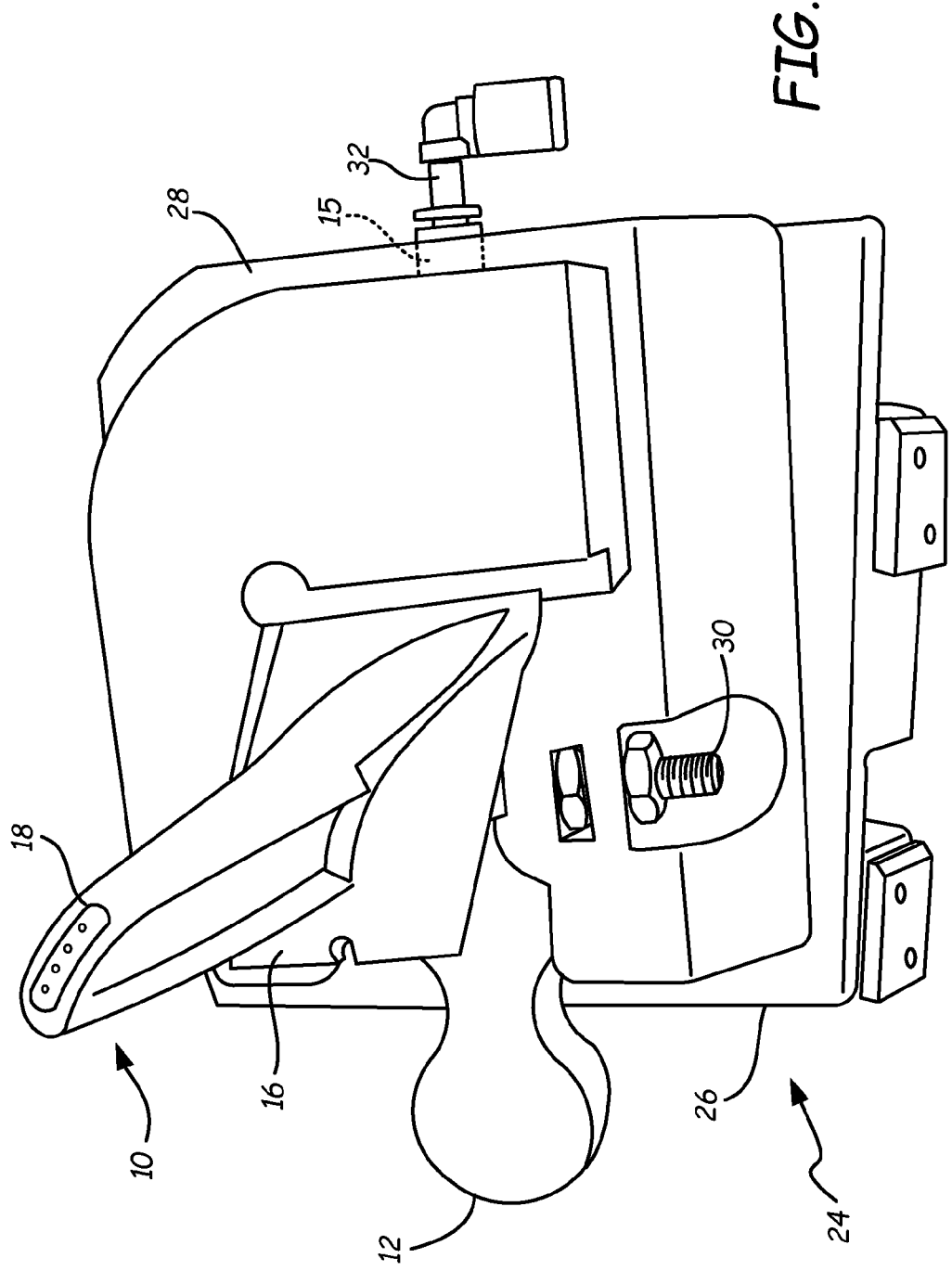
FIG. 2 is a perspective view of the workpiece mounted in the fixture.

FIG. 1 is a perspective view of workpiece 10 and plate 12 of fixture 24 (see FIG. 2). Workpiece 10 is illustrated as a turbine blade that has airfoil 18, platform 16, and root 14. Workpiece 10 may be any hollow cavity component, including a gas turbine engine component such as a blade, a vane, or a blade outer air shield (BOAS). A series of cooling channels 20 extend through root 14, platform 16, and between the walls of airfoil 18. Although illustrated as a turbine blade, the workpiece may be an internally cooled part or component. Plate 12 of fixture 24 contains aperture 22 that will align with one or more of the cooling channels 20 of workpiece 10. In one embodiment, plate 12 contains multiple apertures 22 that align and correspond to cavities in workpiece 10.

FIG. 2 is a perspective view of workpiece 10 mounted in fixture 24. Workpiece 10 is depicted as a turbine blade with platform 16 and airfoil 18 visible, and with root 14 being concealed within fixture 24.

Fixture 24 has base portion 26, locking portion 28, and plate 12. Base portion 26 contains the necessary connections for securing the fixture within an EDM machine, which are readily known who practice in the art. In one embodiment, the base portion is a unitary structure with generally C-shaped channel. The channel provides an area for the placement of locking portion 28 and plate 12 between generally horizontal parallel legs of the C-shaped channel. The vertical portion of the channel acts as a locator for the insertion of locking portion 28 and plate 12. In an alternate embodiment, base portion may contain multiple separate components for the horizontal and vertical portions that are secured together with fasteners. The upper horizontal leg of the C-shaped channel is provided with the necessary locators and recesses to hold and receive platform 16 of workpiece 10.

Fixture 24 has plate 12 which is in contact root 14 of workpiece 10. Plate 12 is illustrated as a generally rectangular plate with a handle extending from the plate for allowing an operator to place the plate 12 within fixture 24. Plate 12 is placed in the channel along the lower horizontal leg of the C-shaped channel. As illustrated in FIG. 1, plate 12 contains aperture 22 that is in communication with an internal channel 15 within the plate. Pressure port 32 is attached to the internal channel 15 in the rectangular portion of plate 12. Pressure port 32 allows for the introduction of a pressurized fluid into workpiece 10 via the channel 15 in the rectangular plate and aperture 22 of plate 12.

Locking portion 28 fits between the upper horizontal leg and lower horizontal leg of the C-shaped channel in base portion 26. Locking portion 28 is L-shaped, with one leg that extends over a top surface of plate 12 and one leg that extends downward adjacent a side surface of plate 12. Locking portion 28 contains at least one adjustable locator 30 for positioning workpiece 10 within fixture 24.

Figure 3:
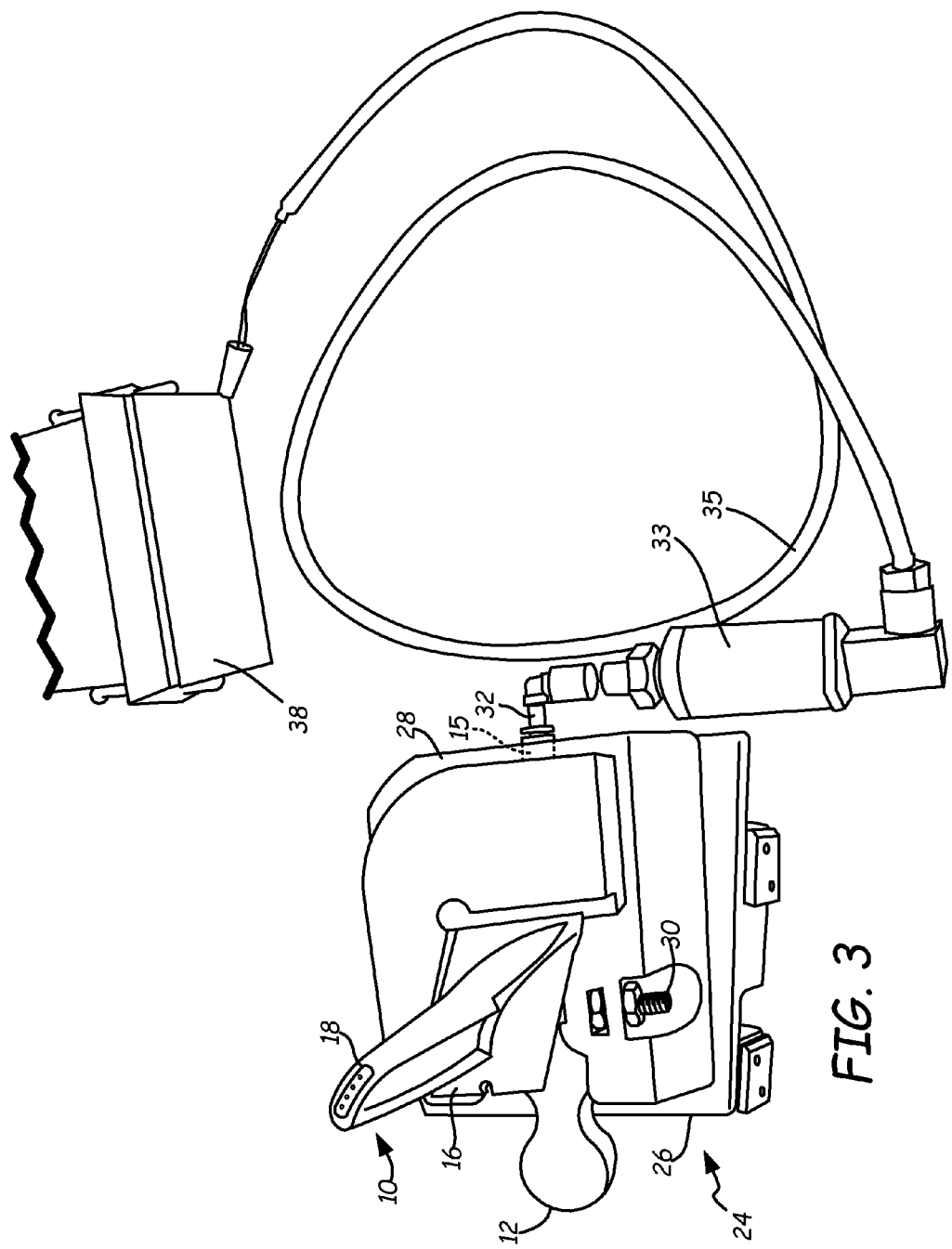
FIG. 3 is a perspective view of the assembly of FIG. 2 connected to a process control mechanism.

FIG. 3 is a perspective of fixture 24 holding workpiece 10 connected to process controller 38. Again fixture 24 has base portion 26, locking portion 28, and plate 12 to secure workpiece 10, which has been previously described. Pressure port 32 connects to pressure transducer 33, which is capable of converting pressure into an electrical signal. The signal is carried by electrical cable 35 to process controller 38. Electrical cable 35 is an assembly containing wires and a protective outer sheath that is common in the art. Process controller 38 allows for the monitoring and programming of set points based on the signals received from pressure transducer 35 that will interact with the EDM machine controls. In an alternate embodiment, pressure port 32 is connected directly to fluid channel or line in communication with pressure transducer 33 absent fixture 24. The fluid channel or fluid line allows for the flow of dielectric fluid therethrough, and is attached to cooling channel 20 in workpiece 10.

Figure 4:
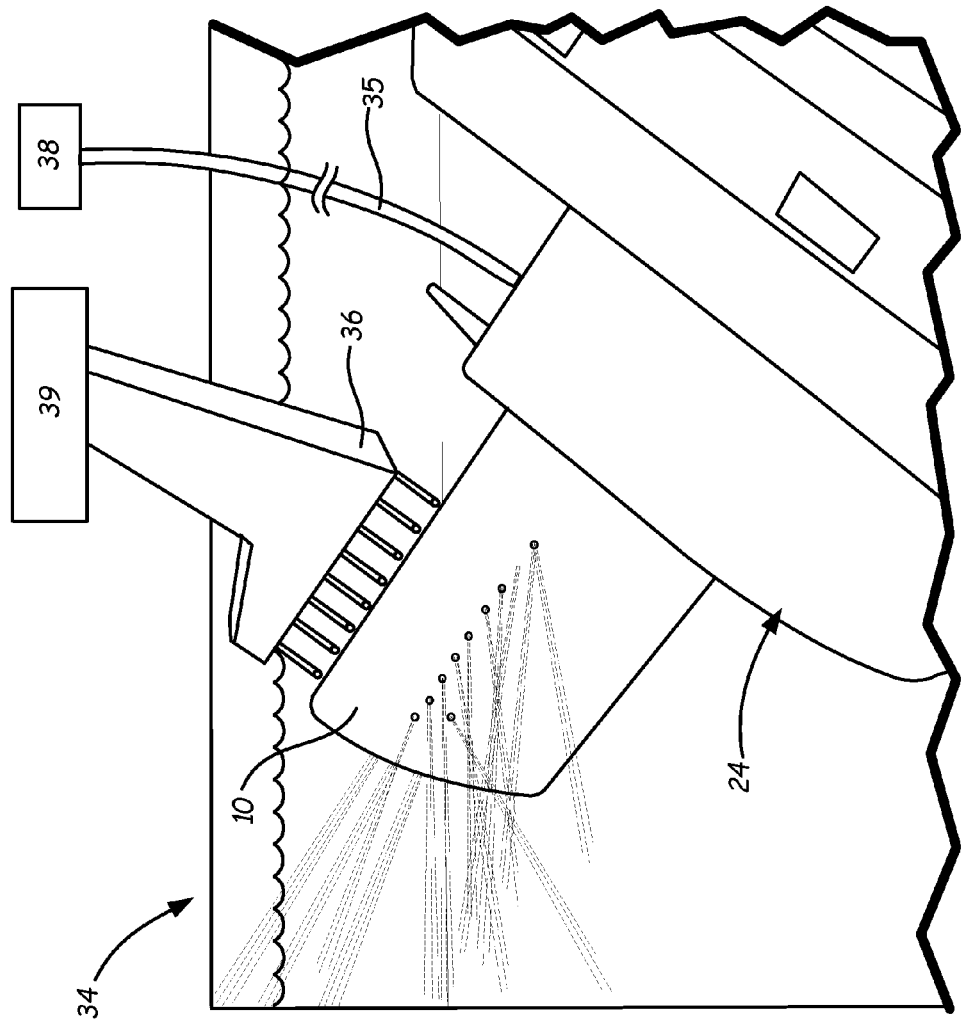
FIG. 4 is a perspective view of an EDM apparatus.

FIG. 4 is a perspective view a typical EDM apparatus for performing the EDM process. EDM is a process in which an electrically conductive metal workpiece is shaped by removing material through melting or vaporization by electrical sparks and arcs. The spark discharge and transient arc are produced by applying controlled pulsed direct current between the workpiece (typically anodic or positively charged) and the tool or electrode (typically the cathode or negatively charged). The end of the electrode and the workpiece are separated by a spark gap generally from about 0.01 millimeters to about 0.50 millimeters, and are immersed in or flooded by a dielectric fluid. The DC voltage enables a spark discharge charge or transient arc to pass between the tool and the workpiece. Each spark and/or arc produces enough heat to melt or vaporize a small quantity of the workpiece, thereby leaving a tiny pit or crater in the work surface. The cutting pattern of the electrode is usually computer numerically controlled (CNC) whereby servomotors control the relative positions of the electrode and workpiece. The servomotors are controlled using relatively complex control algorithms to control the spark discharge and control gap between the tool and workpiece. By immersing the electrode and the workpiece in the dielectric fluid, a plasma channel can be established between the tool and workpiece to initiate the spark discharge. The dielectric fluid also keeps the machined area cooled and removes the machining debris. An EDM apparatus typically includes one or more electrodes for conducting electrical discharges between the tool and the workpiece.

Fixture 24 holding workpiece 10 is secured to the base of tank 34. Tank 34 collects and holds a fluid, which is a dielectric medium such as deionized water. In an alternate embodiment, the fluid is a low viscosity mineral oil or similar substance, and may contain additives that lower the conductivity of the base substance. The fluid provides an insulating medium about workpiece 10 until desired spark conditions are produced, and then acts a conducting medium through which the spark can travel. The fluid also acts to flush disintegrated particles created by the spark away from the work area, and cools the interacting electrode 36 and workpiece 10. In one embodiment, the fluid flows across the part through the use of a circulating system (not illustrated), which includes a discharge or suction port, a pump, and an inlet or pressure port. Fluid 16 may contain additional additives to lubricate the pump and other circulatory systems components.

Tank 34 is sized to hold fixture 24 with workpiece 10. Tank 34 is oversized to allow workpiece 10 to be entirely submerged without allowing the fluid to spill over the edges of tank 34. Tank 34 may be of any geometry provided it meets the aforementioned limitations. In the embodiment illustrated, tank 34 is generally rectangular shaped. Tank 34 is constructed from plastics, polymers, fiberglass, or similar non-conducting materials, or may be fabricated from a dielectrically lined metal or alloy.

The EDM head is mounted above workpiece 10, and has electrode 36. Electrode 36 are either hollow or solid core rods, or shaped stamped/wire-cut structures constructed from any electrically conductive material, including tungsten, copper tungsten carbide, copper graphite alloy, graphite, tantalum tungsten alloy, silver tantalum alloy, or other alloys. Electrode 36 is a consumable, and wears as workpiece material is removed. Electrode 36 may contain a plurality of contact points, or the EDM machine may contain a plurality of electrodes 36. The number of electrodes 36 and/or contact points of each electrode 36 will vary depending on the number of holes to be drilled on workpiece 10, with each electrode 36 capable of drilling a corresponding hole.

Electrode(s) 36 are connected to EDM control 39. EDM control 39 is the operational center of the EDM apparatus. EDM control 39 has a power source that is operated to cause a charge to build up on electrodes 36, which when sufficient causes an electrical current to jump the spark gap. Charge buildup and discharge is achieved by providing a suitable dielectric fluid between electrode 36 and workpiece 10, such that material is removed from workpiece 10 by a sparking discharge action. In one embodiment, EDM control 39 contains a servo motor (not shown) that maintains the spark gap distance through control signals received from a microprocessor based controller (not shown). The controller will sense the gap voltage, determine the offset from a preset value, and send a control signal to the servo motor to advance or retract. EDM control 39 may also have a multi-axis positioner that controls the placement of a tooling mount that holds fixture 24 and controls the position of the electrodes 36 with respect to workpiece 10. The EDM apparatus illustrated also has electrical cable 35 and process controller 38. Process controller 38 communicates with EDM control 39 to further control the EDM process.

Figure 5:
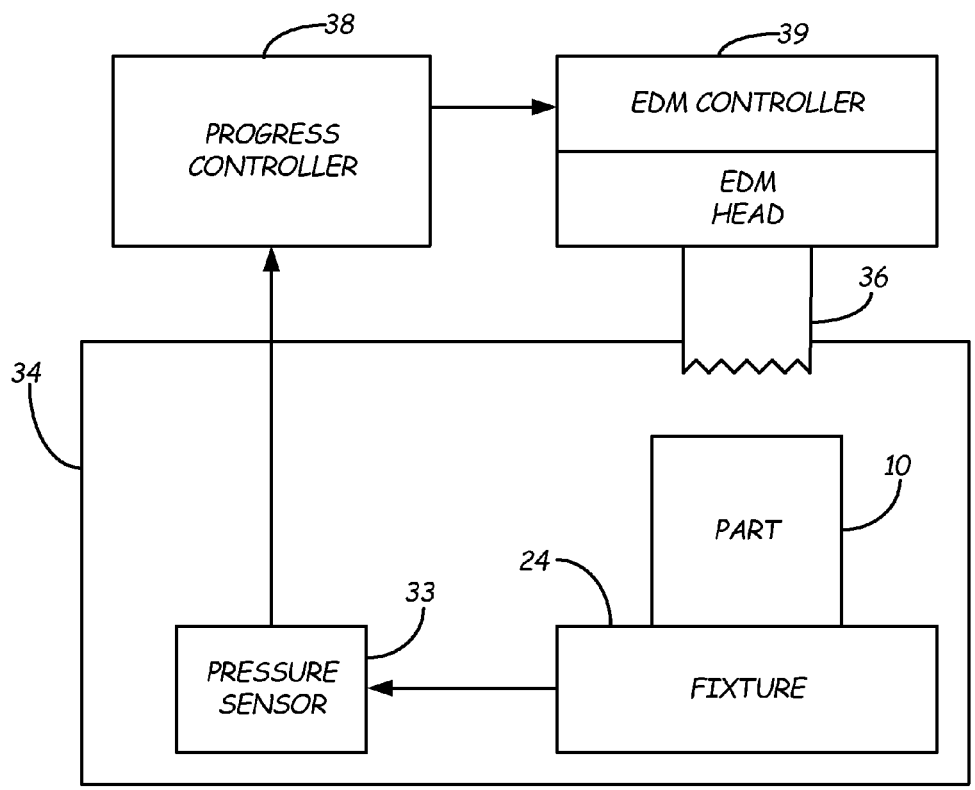
FIG. 5 is a schematic of an EDM apparatus.

FIG. 5 is a schematic view of an EDM apparatus. Fixture 24 holds workpiece 10 in tank 34, which is filled with a dielectric fluid. The interior cavity of workpiece 10 is connected to pressure transducer 33. Pressure transducer 33 monitors the pressure within workpiece 10, and sends the signal to process controller 38. Process controller 38 then forwards the signal to EDM control 39, which controls the movement and material removal of the EDM process by energizing and moving electrode 36.

The disclosed apparatus allows for instant feedback during an EDM hole drilling process. Pressure transducer 33 provides the information about a pressure drop during the drilling process. The pressure drop value may be communicated to EDM control, such as a machine PLC, to adjust drilling parameters or to stop the process before the end of the operation. The communication may be from a hard wire signal, or from a wireless signal from the process controller 38. The feedback is achieved by installing a part on fixture 24 equipped with a pressure probe, such as pressure transducer 33, that registers part back pressure P3. After the fixture is installed in EDM machine, tank 34 is filled with a dielectric fluid. Fixture 24 has an insert (plate 12) that blocks some passages on workpiece 10 and allows EDM fluid only through the cavity being drilled. In the beginning of the process, workpiece 10 becomes pressurized by incoming pressure P1. At the beginning of the drilling process, the back pressure P3 is set up at the predetermined value by adjusting the incoming pressure P1. As soon as electrode 36 starts to break through wall of workpiece 10, the back pressure P3 will be reduced proportionally to effective area of the hole(s). The process is controlled by using the established back pressure drop profile. The profile is determined by flowing EDM fluid through a master part with known values in terms of pressure drop and airflow pressure ratio. The correlation between pressure drop and airflow pressure ratio can be obtained experimentally taking into consideration fluid properties.

In another embodiment, pressure transducer 33 determines a pressure differential between the fluid in the tank and the pressure of the fluid in the cavity of workpiece 10. In yet another embodiment, the pressure transducer senses a pressure drop, and the resultant pressure drop is compared to a target value and a feedback to the electric discharge machine controller to adjust the electric discharge machine parameters to generate desired geometry for an aperture following breakthrough. Alternatively, the pressure transducer senses a pressure drop, and the resultant pressure drop of a first aperture in the workpiece is compared to a nominal value and a feedback to the electric discharge machine controller. This electric discharge machine controller adjusts the parameters for drilling a second aperture so that the cumulative pressure gradient for the first and second apertures is targeted to the established nominal value.

Figure 6:
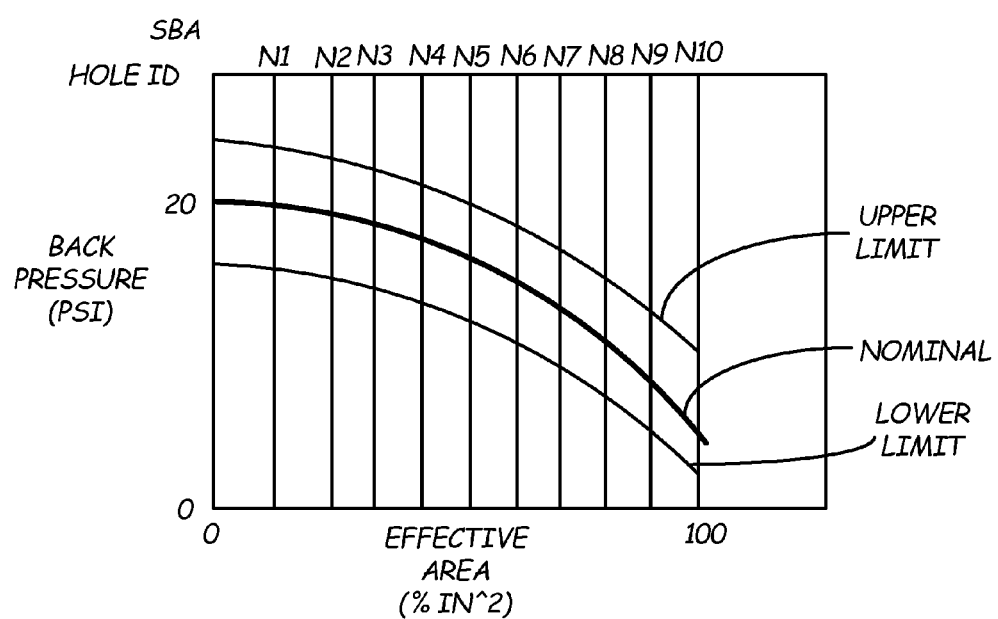
FIG. 6 is a graph illustrating the relationship between pressure gradient and effective area of cooling holes in the workpiece.

For example, FIG. 6 illustrates a graph that showing the correlation between the established workpiece airflow through the individual holes as a Back Pressure Drop and an Effective Area of the apertures being created during the EDM machining process for creating the apertures. For each of the holes identified (N1-Nx) on the graph, a nominal back pressure drop profile is established. The more holes that are created and drilled, the more the drop in back pressure, which drops in proportion to the cumulative Effective Area.

The back pressure drop profile can be correlated with airflow testing. The airflow test is performed using the same master part workpiece that was used for EDM Hole drilling. The airflow test consists of flowing the part and recording the pressure ratio of a single hole N1, then adding another hole Nx, and so on until all holes cumulative pressure ratio for the row in the cavity is established. By achieving the master part workpiece correlation between the back pressure drop profile and airflow testing pressure ratio profile, the in-process airflow testing can be eliminated as an extra step in production, or minimized to use fewer resources. The advantage of this method is having a permanent record for each individual hole in terms of back pressure drop. Then, the back pressure number can be converted to pressure ratio that can be utilized in programming the EDM controller. The resultant program can then be used to prevent wall strikes on the interior of the workpiece, or to adjust for differences in wall geometries in the original forming of the workpiece.

The disclosed apparatus and method develops a real time process monitoring method to control the EDM small hole drilling manufacturing process utilizing fluid flow pressure as the means of process feedback. The apparatus will minimize rework due to wall strikes, blocked holes and non-conforming airflow test results.

With the disclosed apparatus, a method of machining a workpiece utilizing electric discharge machining starts with securing a workpiece to a fixture in a tank can be performed. A pressure transducer is connected to the fixture. Material is removed from the workpiece by electric discharge machining to create at least one aperture in the workpiece. The material removal is stopped based upon a signal received from the pressure transducer. Additionally, the process controller is in communication with the pressure transducer, which transmits a signal from the process controller to a master controller of the electric discharge machine. The signal may be based on the effective area of the aperture.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for machining apertures into a conductive workpiece with a cavity, the apparatus comprising:
    a tank for containing a dielectric fluid;
    a fixture for holding the workpiece in the tank;
    an electric discharge machine for forming apertures in the workpiece by electric discharge machining;
    a pressure transducer connected to the fixture for sensing pressure within the cavity of the workpiece; and
    a process controller in communication with an electric discharge machine controller and pressure transducer for controlling operation of the electric discharge machine as a function of the sensed pressure.

2. The apparatus of claim 1 wherein the electric discharge machine further comprises an electrode, a power supply connected to the electrode that produces machining pulses for electric discharge machining through the workpiece, and the controller for regulating the power supply and electrode position.

3. The apparatus of claim 1 wherein the electrode contains a plurality of contact points for simultaneously machining a plurality of holes.

4. The apparatus of claim 1 wherein the workpiece is a hollow cavity component.

5. The apparatus of claim 4 wherein the hollow cavity component is a gas turbine engine blade, vane, or blade outer air shield.

6. The apparatus of claim 1 wherein the fixture contains a fluid communication channel connected to the pressure transducer.

7. The apparatus of claim 6 wherein the fluid communication channel of the fixture contains an aperture, wherein the aperture aligns with a hollow cavity in the workpiece.

8. A method of machining a workpiece with a cavity utilizing electric discharge machining, the method comprising:
    securing a workpiece in a tank;
    connecting a pressure transducer to a fluid channel carrying a dielectric fluid to sense pressure within the cavity of the workpiece;
    removing material from the workpiece by electric discharge machining to create at least one aperture; and
    stopping the material removal based upon a signal received from the pressure transducer;
    wherein the pressure transducer senses a pressure drop, and the resultant pressure drop of a first aperture in the workpiece is compared to a nominal value and a feedback to the electric discharge machine (EDM) controller which adjusts the parameters for drilling a second aperture so that the cumulative pressure gradient for the first and second apertures is targeted to the established nominal value; and
    wherein the cavity in the workpiece is connected to a fluid channel in a fixture, and the fluid channel in the fixture is connected to the pressure transducer.

9. The method of claim 8 wherein the stopping material removal is based upon a signal received that breakthrough of a workpiece wall into the cavity has occurred.

10. The method of claim 8 wherein removing material comprises drilling a plurality of apertures in the workpiece.

11. The method of claim 10 wherein the signal from the pressure transducer is based upon an effective area of the plurality of apertures.

12. The method of claim 8 further comprising:
    providing a process controller in communication with the pressure transducer.

13. The method of claim 12 further comprising:
    transmitting a signal from the process controller to the electric discharge machine controller.

14. The method of claim 12 wherein the pressure transducer senses a pressure drop, and the resultant pressure drop is compared to a target value and a feedback to the electric discharge machine controller to adjust the electric discharge machine parameters to generate a desired aperture geometry following breakthrough.

15. A method of drilling a plurality of holes in a hollow cavity component, the method comprising:
    fixturing the component within a tank containing a bed of fluid;
    positioning an electric discharge machine over the component;
    machining the plurality of holes simultaneously by utilizing the electric discharge machine containing a plurality of electrodes;
    sensing pressure from an interior cavity of the component with a pressure transducer; and
    stopping the machining based on the sensed pressure;
    wherein the signal is produced from a differential pressure between a cavity in the component and the pressure of the fluid in the tank.

16. The method of claim 15 wherein the component is a gas turbine engine component.

17. The method of claim 15 further comprising:
    transmitting a signal from a process controller in communication with the pressure transducer to a master controller of the electric discharge machine.

* * * * *